AUTOMATIC TELEPHONE DIALING SYSTEM

Filed Sept. 11, 1959 4 Sheets-Sheet 1

INVENTORS
KENNETH W. WREDE,
RICHARD W. ELLIOTT,
BY
McMorrow, Berman + Davidson
ATTORNEYS.

AUTOMATIC TELEPHONE DIALING SYSTEM

Filed Sept. 11, 1959 4 Sheets-Sheet 2

INVENTOR.
KENNETH W. WREDE,
RICHARD W. ELLIOTT,
BY
McMorrow, Berman + Davidson
ATTORNEYS.

INVENTOR.
KENNETH W. WREDE,
RICHARD W. ELLIOTT,
BY
McMorrow, Berman & Davidson
ATTORNEYS.

INVENTORS
KENNETH W. WREDE,
RICHARD W. ELLIOTT,
BY
McMorrow, Berman + Davidson
ATTORNEYS.

United States Patent Office 3,021,392
Patented Feb. 13, 1962

3,021,392

AUTOMATIC TELEPHONE DIALING SYSTEM

Kenneth W. Wrede, Warner Robins, Ga. (OMR 3041-B, Box 77, Sqd. 3401, Keesler AFB, Miss.), and Richard W. Elliott, Lot A-16 Walkers MHE, Warner Robins, Ga.

Filed Sept. 11, 1959, Ser. No. 839,491
9 Claims. (Cl. 179—90)

This invention relates to telephone dialing systems, and more particularly to an attachment for a telephone dialing assembly wherein desired telephone numbers are dialed by sequentially actuating corresponding pushbuttons.

A main object of the invention is to provide a novel and improved automatic dialing attachment for a telephone dialing system wherein pushbuttons are normally employed to dial desired telephone numbers, the attachment being simple in construction, being easy to install, and being arranged so that any one of a number of predetermined telephone numbers may be automatically dialed by merely actuating corresponding pushbutton switches provided on the attachment without the necessity of actually sequentially operating the normal pushbutton switches of the telephone dialing assembly.

A further object of the invention is to provide an improved automatic dialing attachment for a pushbutton telephone dialing assembly wherein it is possible to automatically dial designated telephone numbers merely by pushing a single pushbutton, associated with the desired telephone number.

A further object of the invention is to provide an improved automatic dialing attachment for pushbutton telephone dialing assemblies, the attachment involving relatively inexpensive components, being compact in size, and being arranged so that it is relatively easy to change the preset telephone numbers which are to be dialed automatically by the use of the attachment.

A still further object of the invention is to provide an improved automatic dialing attachment for a pushbutton telephone number dialing assembly, the attachment being arranged so that it may be set to enable important and often used telephone numbers to be instantaneously dialed without the necessity of operating a plurality of pushbutton elements of the telephone dialing assembly, whereby a considerable saving of time and effort is provided in calling important and often used numbers.

Further objects and advantages of the invention will become apparent from the following description and claims, and from the accompanying drawings, wherein:

Figure 1:
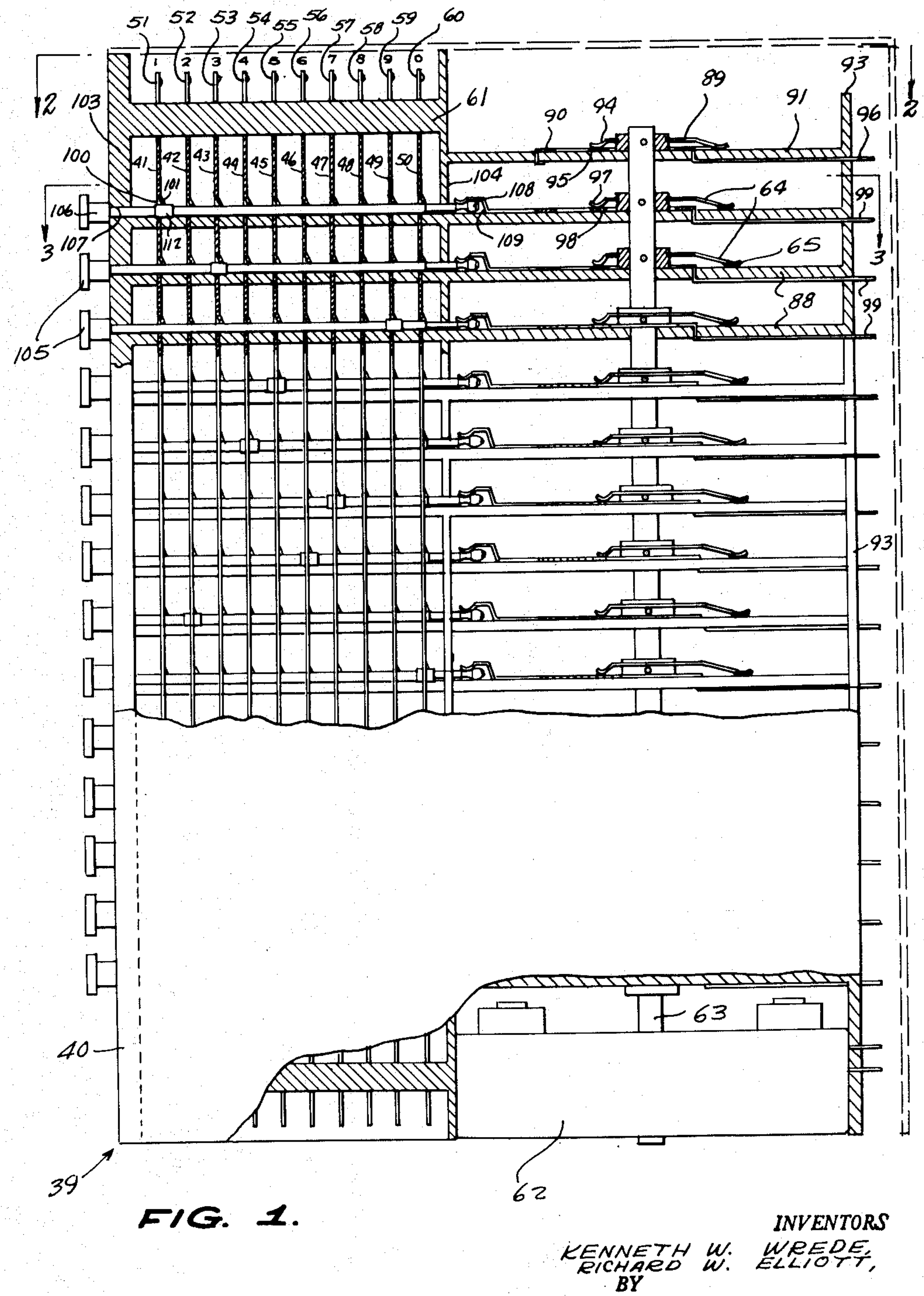
FIGURE 1 is a top plan view, partly in horizontal cross section, of a switch assembly employed in the automatic dialing system of the present invention.

Referring to the drawings, 11 designates a conventional pushbutton dialing unit which is employed to provide a sequence of pulses in a telephone line corresponding to those obtained by operating the well known rotatable dial mechanism. Thus, the dialing unit 11 is connected at one terminal thereof to a line 12 and is provided with a plurality of additional terminals 13 to 22 which are connected to a telephone control unit including means to furnish respective trains of pulses to the telephone line responsive to the connection of any of the terminals 13 to 22 to the line wire 12. The telephone control unit may be of a type including code disc pulsers or similar devices to provide trains of pulses from one to ten pulses in the telephone line responsive to the connection of the respective terminals 13 to 22 to the line wire 12. In the conventional device 11 illustrated, ten pushbutton switches 23 to 32 are provided, the pushbuttons thereof being exposed at the front face 33 of the unit and being suitably inscribed with the usual indicia, comprising numbers, letters, and the like, enabling a desired number to be dialed by actuating the pushbuttons in a corresponding sequence.

The structure thus far described is entirely conventional and in itself forms no part of the present invention, being merely presented in order to provide an understanding of the specific utility of applicants' attachment. As above stated, applicants' attachment is intended to provide a means for automatically sequentially connecting selected ones of the terminals 13 to 22 to the line wire 12 in a predetermined sequence corresponding to a desired number to be dialed, eliminating the necessity of sequentially actuating the associated required sequence of pushbutton switches selected from the switches 23 to 32.

Figure 5:
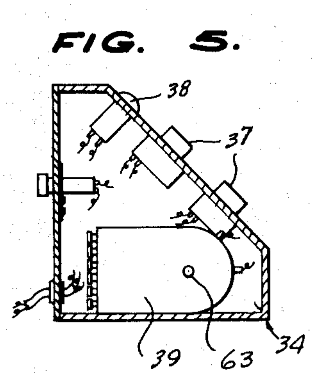
FIGURE 5 is a vertical cross sectional view taken on the line 5—5 of FIGURE 4.
Figure 4:
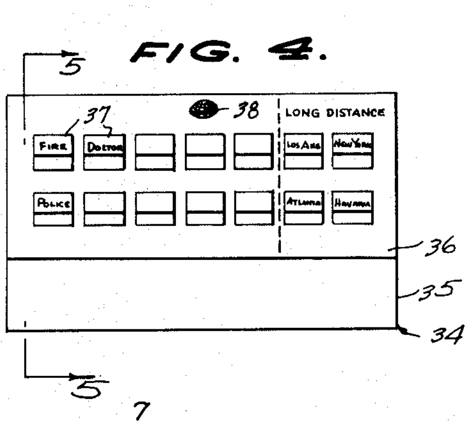
FIGURE 4 is a front elevational view of the automatic dialing attachment of the present invention.

The automatic dialing attachment of the present invention is designated generally at 34 and comprises a housing 35 having a downwardly and forwardly inclined top wall 36 on which are mounted a plurality of pushbutton switches 37 of the double-pole, single throw type, the switches being normally open and closing responsive to pressure exerted thereon. Also mounted on the inclined wall 36 is a pilot light assembly 38 which is located in a conspicuous position, for example, in a position above and centered over the double row of pushbutton switches 37 illustrated in FIGURES 4 and 5.

Mounted in the housing 36 is a switch assembly 39, presently to be described in detail.

It will be understood that any type of enclosure may be employed for the dialing attachment, and that the attachment may be contained in the same housing as the telephone unit, telephone box or telephone handset.

As will be readily apparent, the switches 37 may be suitably marked with indicia designating specified telephone numbers, such as frequently used and important telephone numbers which it is desired to be obtainable quickly and without the necessity of looking the numbers up in a telephone directory or similar source of such information. The pushbutton elements may be identified by actually providing inscriptions on the pushbuttons or may be suitably colored or otherwise characterized for easy selection. The switch members 37 provided on the inclined wall 36 may include not only local numbers but also long distance numbers, available by normal dialing, whereby such long distance numbers may be obtained with the same facility as the local numbers provided by the dialing system with which the device of the present invention is employed.

The switch assembly 39 comprises a housing 40 of insulating material in one side portion of which are mounted the spaced parallel series of metal conductor plates 41 to 50 which are integrally connected to respective terminals 51 to 60 projecting from one end wall 61 of the housing 40.

Figures 10, 11:
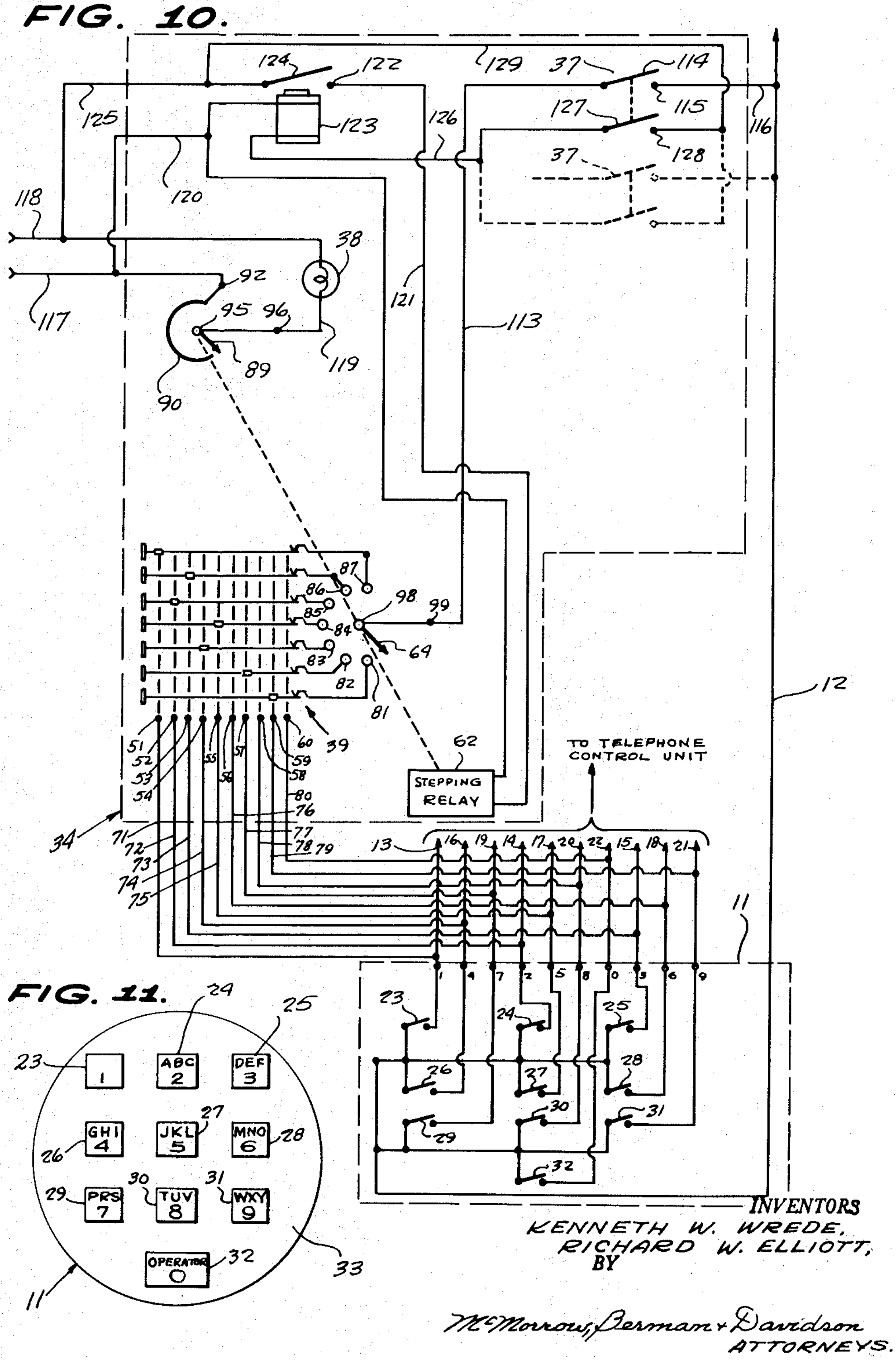
FIGURE 10 is a schematic wiring diagram showing the electrical connections of one set of switch bank members of the automatic dialing attachment, in accordance with a designated telephone number to be set up for automatic dialing, and also showing the electrical connections of the automatic dialing attachment to the pushbutton actuated normal dialing switch assembly of a telephone installation.
FIGURE 11 is a front elevational view of the pushbutton switch panel of the normal pushbutton dialing assembly of a telephone installation with which the attachment of the present invention is adapted to be employed.

The terminals 51 to 60 of the switch 39 are connected by respective wires 71 to 80 to the terminals 13 to 22 of the conventional pushbutton dialing unit 11, as is clearly shown in FIGURE 10.

As will be readily apparent, ten conductive plates 41 to 50 are provided, corresponding to the ten pushbutton switches 23 to 32 provided on the conventional pushbutton switch dialing unit 11.

Figure 2:
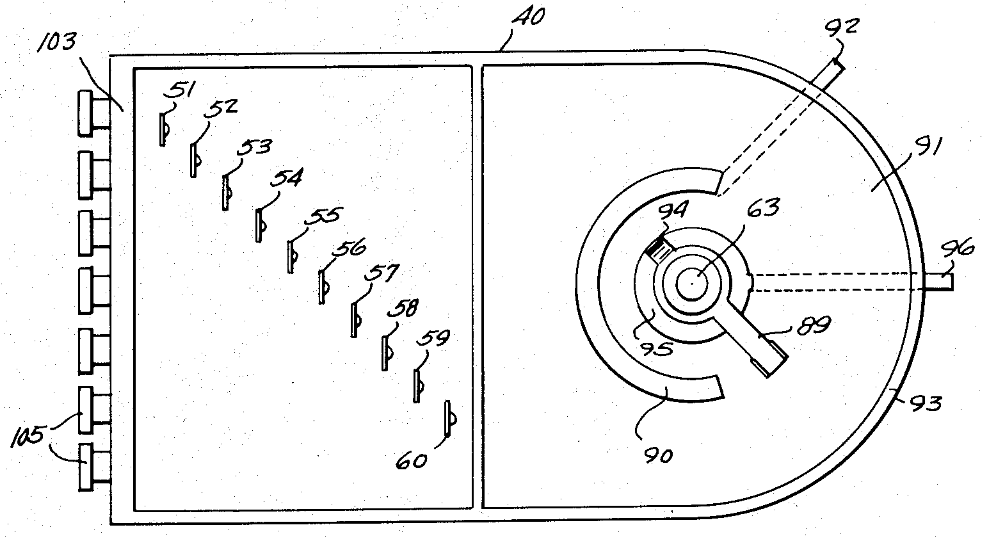
FIGURE 2 is an end elevational view of the switch assembly, taken substantially on the line 2—2 of FIGURE 1.
Figure 3:
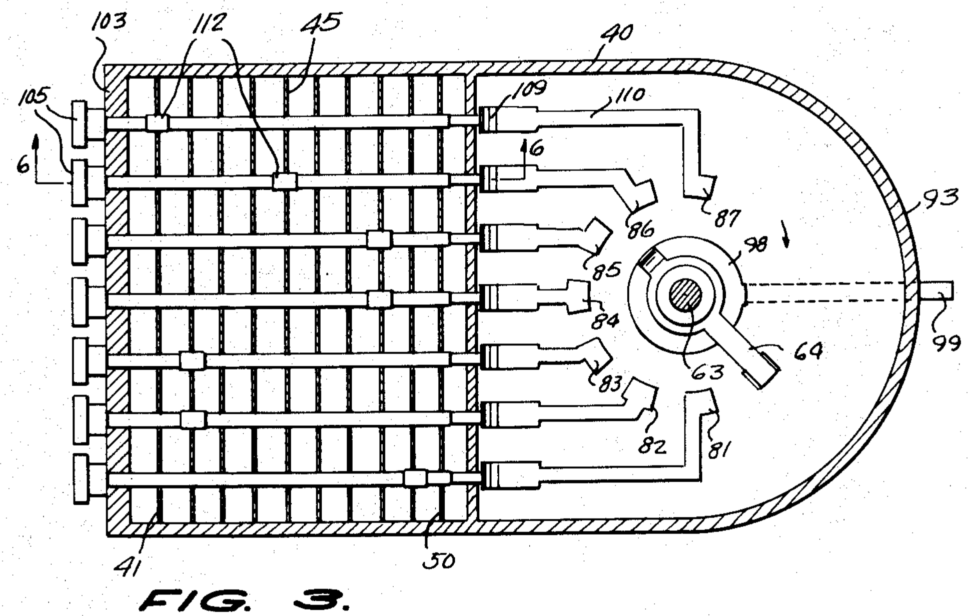
FIGURE 3 is a vertical cross sectional view taken on the line 3—3 of FIGURE 1.

Designated at 62 is a stepping relay of conventional construction which is mounted in the switch housing 40 adjacent the end of the housing opposite the end wall 61, as shown in FIGURE 1. The stepping relay 62 is provided with the rotary shaft 63, of insulating material, on which are secured the resilient spaced contact arms 64, which are uniformly spaced along the shaft 63 and which are provided at one end with contact brush elements 65 which are successively engageable with respective groups of spaced stationary contacts 81 to 87 mounted on transverse insulating walls 88 in response to the stepwise actuation of the stepping relay 62. The number of rotary contact arms 64 provided on the shaft 63 corresponds to the number of preset telephone number pushbutton switches 37 provided on the inclined front face 36 of the attachment 34. An additional rotary contact arm 89 is secured on the end of the shaft 63, the contact arm 89 being engageable with an arcuate contact strip 90 mounted in the end wall portion 91 of the switch housing, as shown in FIGURES 1 and 2. The stationary arcuate contact strip 90 is provided at one end with a terminal portion 92 which projects through the arcuate side wall portion 93 of the switch housing. The resilient contact arm 89 is provided with a short contact end portion 94 which continuously engages a contact ring 95 secured on the end wall 91 inside and concentrically with the arcuate contact strip 90. The contact ring 95 is provided with the externally projecting terminal element 96. The resilient contact arms 94 are similarly provided with short resilient contact arm portions 97 which continuously engage stationary contact rings 98 mounted in the transverse wall portions 88 and provided with externally projecting terminals 99 which are exposed externally of the arcuate wall portion 93.

The contact plates 41 to 50 are formed with vertical and horizontal rows of contact openings 100 which are in registry with each other and which are struck inwardly to define inclined contact brush portions 101, as shown in FIGURE 1. The vertical front wall 103 of the switch housing is formed with similar apertures registering with the rows of apertures in the plates 41 to 50, and the housing is provided with an intermediate wall 104 which is formed with similar apertures registering with the apertures of the front wall 103 and the rows of apertures in the contact plates 41 to 50. Respective switch plugs 105 are provided, said plugs being insertable through the registering apertures in the manner illustrated in FIGURE 1, being provided with enlarged head portions 106 engageable against the wall 103 at the apertures 107, as shown in FIGURE 1, and provided at their inner ends with ball portions 108 lockingly and conductively engageable with resilient contact clips 109 formed on the ends of conductive strips 110′ merging with respective stationary contact elements 81 to 87.

Figures 6, 7, 8:
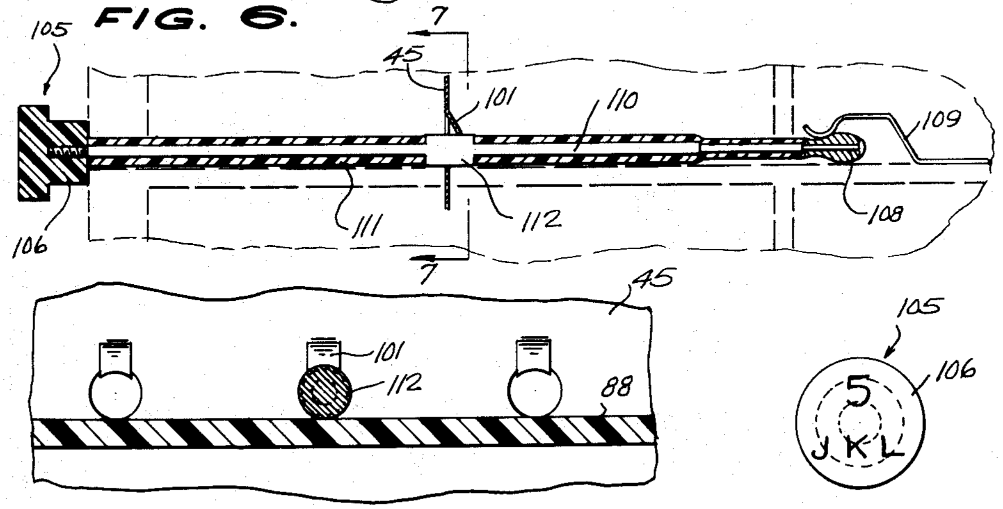
FIGURE 6 is an enlarged longitudinal cross sectional view taken through one of the changeable plug elements employed in the switch assembly, said view being taken on the line 6—6 of FIGURE 3.
FIGURE 7 is a transverse vertical cross sectional view taken substantially on the line 7—7 of FIGURE 6.
FIGURE 8 is an end view of the switch plug member illustrated in FIGURE 6.
Figure 9:
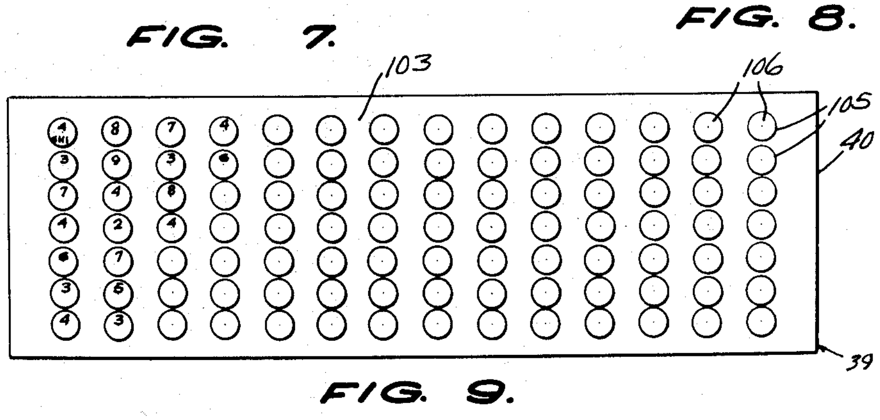
FIGURE 9 is a front elevational view to a reduced scale of the switch assembly shown in FIGURE 1.

As shown in FIGURES 6 and 7, the switch plug members 105 each comprises a conductive metal core 110 surrounded for the major portion thereof by an insulating sleeve or covering 111, the core 110 being connected to the exposed end conductive ball 108. At a selected point along its length, the plug element is provided with an exposed conductive collar portion 112 which is integral or which is otherwise fixedly and conductively connected to the core element 110 and which is adapted to conductively engage a selected one of the contact brush elements 101, in accordance with a corresponding digit of a desired telephone number to be preset by the attachment. As shown in FIGURE 8, the head portion 106 is suitably inscribed with indicia corresponding to the number or letter which corresponds to the particular location of the conducting collar element 112 along the length of the switch plug. In the example illustrated in FIGURES 6, 7 and 8, the collar element 112 is located to engage the contact brush element 101 of the conductive plate 45, which is the fifth plate in the sequence illustrated and which therefore corresponds with the fifth digit, namely, the number "5," or the letters "J," "K," or "L," which may be included in a designated telephone number. As will be further apparent, the specific switch plug illustrated in FIGURES 6, 7 and 8 also corresponds to the actuation of the pushbutton switch 27 of the conventional dialing unit 11, in dialing the telephone number including the digit or letter associated with the switch plug element.

From the above it will be apparent that the switch plug members establish contact between selected conductive plates 41 to 50 and the respective stationary contact elements 81 to 87 of a bank of contacts associated with a rotary switch arm 64. As will be further apparent, the switch arm 64 successively engages the contacts 81 to 87 during the energization of the step relay 62, and thus successively connects a group of selected contact plates from the series of plates 41 to 50 to the terminal 99 associated with each bank of contacts 81 to 87.

Each contact 99 is connected by a wire 113 to one pole 114 of the associated double-pole single throw pushbutton switch 37. The stationary contact 115 associated with said pole is connected by a wire 116 to the telephone control line wire 12.

Designated at 117 and 118 are a pair of supply conductors leading to a conventional power supply source, such as an ordinary alternating current supply receptacle. Line wire 117 is connected to the terminal 92, and is thus connected to the arcuate stationary contact element 90. Line wire 118 is connected to one terminal of the pilot lamp assembly 38, the opposite terminal of the pilot lamp assembly being connected by a wire 119 to the terminal 96. Thus, the pilot lamp 38 is energized as soon as the rotary contact arm 89 engages the end of the arcuate contact strip 90, namely, at the first step of the stepping relay 62.

Line wire 117 is connected by a wire 120 to one terminal of the stepping relay 62. The other terminal of the stepping relay is connected by a wire 121 to the stationary contact 122 of a normally open control relay 123. The pole 124 of the relay is connected by a wire 125 to the line wire 118.

One terminal of the control relay 123 is connected to the line wire 117 through the wire 120. The other terminal of the winding of the relay 123 is connected by a wire 126 to the remaining pole 127 of each of the pushbutton switches 37. The stationary contact 128 of each pushbutton switch 37 is connected to a wire 129 which is in turn connected through the wire 125 to the line wire 118. Thus, when any of the switches 37 is closed, the relay 123 becomes energized by a circuit comprising line wire 117, wire 120, the winding of the relay, wire 126, the pole 127 of the associated switch 37, contact 128 engaged by said pole, wire 129, wire 125 and line wire 118. Armature 124 then engages stationary contact 122, energizing the stepping relay 62 by a circuit comprising line wire 118, wire 125, armature 124, contact 122, wire 121, the winding of the relay 62, the wire 120, and the line wire 117.

Energization of the stepping relay 62 causes the shaft 63 to be rotated in regular intermittent steps wherein each resilient contact arm 64 successively engages its associated contacts 81 to 87, with small dwell periods of the order of 1/16 of a second wherein the arm 64 rests on the stationary contact. This successively connects a group of terminals selected from the terminals 13 to 22, in accordance with the designated telephone number set up by the number plugs 105, to the telephone control unit line wire 12, thus performing the same operation as would be accomplished by successively actuating the corresponding selected group of pushbutton switches on the manually operated dialing unit 11.

The pilot light unit 38 becomes energized by the engagement of the contact arm 89 with the arcuate contact strip 90, namely, at the first step of the stepping relay 62. The contact arm 89 remains in engagement with the arcuate contact strip 90 until the complete sequence of operations of the contact arms 64 is accomplished, namely, until the selected contact arm 64 completes engagement with the final contact 87 of the bank of contacts associated with the desired telephone number, namely, the number selected by operating the selected pushbutton switch 37. At this point the pushbutton switch 37 may be released, since the extinction of the pilot lamp indicates that the dialing operation has been completed. Release of the pushbutton switch 37 allows the relay 123 to become deenergized, since the energizing circuit of the relay is opened by the disengagement of pole 127 from its associated contact 128. The relay armature 124 disengages from its contact 122, deenergizing the stepping relay, and allowing the relay to be returned to its starting position by conventional means (not shown).

The attachment may be designed so that a substantial number of predetermined telephone numbers may be preset thereby, for example, as many as fourteen numbers may be preset in the specific embodiment illustrated in the drawings. To preset a number, it is merely necessary to select the appropriate switch contact plugs 105 and insert the plugs in a vertical row of apertures in the front wall 103 of the switch housing in the sequence corresponding to the sequence of characters in the desired telephone number. In the illustrated embodiment of the invention, the attachment is designed for setting up seven numbers, in accordance with the standard number of characters in the telephone numbers used in most areas. In some areas different numbers of characters are employed, for example, four, five or six number combinations. In such areas, no number plugs will be used in the fifth, sixth and seventh positions in the vertical rows of apertures on the front wall 103 of the switch housing.

The operation of the device is relatively simple, as will be apparent from the above description. It is merely necessary to actuate the pushbutton switch 37 corresponding to the desired number, keeping the pushbutton depressed as long as the pilot lamp 38 remains illuminated. As soon as the lamp 38 becomes extinguished, the pushbutton may be released since this indicates that the dialing process has been completed. As above explained, the conventional stepping relay 62 will reset itself to its zero position responsive to the deenergization thereof, preparing the device for its next use.

It will be understood that any desired number of conductor plates, such as the plates 41 to 50, may be used, as the situation demands. Seven plates are illustrated as being used in the above illustrated example of the invention, in accordance with a common situation. However, for long distance direct dialing, at least ten plates would be required in most areas; other applications of the present invention may require an even larger number of plates.

Insulating material may be employed between the plates in the case of subminiature manufacture. Obviously, the size of the whole unit may be made as small as is practical, being mainly limited by the minimum size of the stepping relay. In subminiature applications, the size of the switch assembly may be reduced to a relatively small volume.

As will be apparent from the above description, the attachment of the present invention takes the place of the separate and individually operated character pushbuttons 23 to 32 of the conventional pushbutton dialing device 33 and automatically performs a sequential closure of the circuit between selected terminals 13 to 22 and the line wire 12, in place of the manually operated pushbutton switches 22 to 32, whereby to automatically dial a predetermined desired telephone number, which may be set up by a proper selection of plugs in the various vertical rows of plugs 105 inserted in the switch device 39.

While a specific embodiment of an improved automatic dialing attachment for use with a pushbutton dialing system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an automatic dialing attachment of the character described, a switch assembly having a plurality of switch terminals, respective parallel conductor plates connected to said terminals, a plurality of spaced rows of contact elements extending perpendicularly through said conductor plates, each being in electrical contact with a selected conductor plate, a stepping relay assembly including a plurality of circularly arranged banks of contacts, means connecting the contacts of each bank to a row of said contact elements, and respective rotary switch arms sequentially engageable with the banks of contacts responsive to energization of the stepping relay, a line terminal, and means to selectively connect said switch arms to said line terminal and simultaneously energize said stepping relay.

2. In an automatic dialing attachment of the character described, a switch assembly having a plurality of switch terminals, respective parallel conductor plates connected to said terminals, a plurality of spaced rows of contact elements extending perpendicularly through said conductor plates, each being in electrical contact with a selected conductor plate, a stepping relay assembly including a plurality of circularly arranged banks of contacts, means connecting the contacts of each bank to a row of said contact elements, and respective rotary switch arms sequentially engageable with the banks of contacts responsive to energization of the stepping relay, a line terminal, means to selectively connect said switch arms to said line terminal and to simultaneously energize said stepping relay, an electrically operated indicator device, and means to energize said indicator device responsive to the energization of said stepping relay.

3. In an automatic dialing attachment of the character described, a switch assembly having a plurality of switch terminals, respective parallel conductor plates connected to said terminals, a plurality of horizontally spaced vertical rows of plug elements extending perpendicularly through said conductor plates, each being in electrical contact with a selected conductor plate, a stepping relay assembly including a plurality of circularly arranged banks of contacts, means connecting the contacts of each bank to a row of said plug elements, and respective rotary switch elements sequentially engageable with the banks of contacts responsive to energization of the stepping relay, a line terminal, and means to selectively connect said switch elements to said line terminal and to simultaneously energize said stepping relay.

4. In an automatic dialing attachment of the character described, a switch assembly having a plurality of switch terminals, respective parallel conductor plates connected to said terminals, a plurality of horizontally spaced vertical rows of plug elements extending perpendicularly through said conductor plates, each plug element being in electrical contact with a selected conductor plate, a stepping relay assembly including a plurality of circularly arranged banks of contacts, means connecting the contacts of each bank to a row of said plug elements, and respective rotary switch arms sequentially engageable with the banks of contacts responsive to energization of the stepping relay, a line terminal, means to selectively connect said switch arms to said line terminal and to simultaneously energize the stepping relay, an electrically operated indicator device, and means to energize said indicator device responsive to the energization of said stepping relay.

5. In an automatic dialing attachment of the character described, a switch assembly having a plurality of switch terminals, respective parallel conductor plates connected to said terminals, a plurality of horizontally spaced vertical rows of plug elements extending perpendicularly through the plates, each plug element comprising an elongated conductor, insulating means surrounding the major portion of the conductor and exposing the conductor at a selected portion thereof, said selected portion being located to make electrical contact with a selected conductor plate, a stepping relay assembly including a plurality of circularly arranged banks of contacts, means connecting the contacts of each bank to a row of said plug elements, and respective rotary switch arms sequentially engageable with the banks of contacts responsive to energization of the stepping relay, a line terminal, and means to selectively connect said switch arms to said line terminal and to simultaneously energize said stepping relay.

6. In an automatic dialing attachment of the character described, a switch assembly having a plurality of switch terminals, respective parallel conductor plates connected to said terminals, a plurality of horizontally spaced vertical rows of plug elements extending slidably and perpendicularly through the plates, each plug element comprising an elongated conductor, insulating means surrounding the major portion of the conductor, said insulating means being formed and arranged to expose the conductor at a selected portion thereof located to make electrical contact with a selected conductor plate, a stepping relay assembly including a plurality of circularly arranged banks of contacts, means connecting the contacts of each bank to a row of said plug elements, and respective rotary switch arms sequentially engageable with the banks of contacts responsive to energization of the stepping relay, a line terminal, and means to selectively connect said switch arms to said line terminal and to simultaneously energize said stepping relay.

7. In an automatic dialing attachment of the character described, a switch assembly having a plurality of switch terminals, respective parallel conductor plates connected to said terminals, a plurality of horizontally spaced vertical rows of plug elements extending slidably and perpendicularly through the plates, each plug element comprising an elongated conductor, insulating means surrounding the major portion of the conductor and being formed and arranged to expose the conductor at a selected portion thereof, said selected portion being located to make electrical contact with a selected conductor plate, a stepping relay assembly including a plurality of circularly arranged banks of contacts, means connecting the contacts of each bank to a row of said plug elements, and respective rotary switch arms sequentially engageable with the banks of contacts responsive to energization of the stepping relay, a line terminal, pushbutton operated means to selectively connect said switch arms to sad line terminal and to simultaneously energize said stepping relay, an electrically operated indicator device, and means to energize said indicator device responsive to the energization of said stepping relay.

8. An automatic telephone dialing attachment of the character described comprising a switch assembly having a plurality of switch terminals adapted to be connected to the pushbutton switch terminals of a pushbutton dialing assembly, respective parallel vertical conductor plates connected to said first-named switch terminals, a plurality of horizontally spaced vertical rows of plug elements extending slidably through the plates perpendicular thereto, each plug element comprising an elongated conductor, insulating means surrounding the conductor for its major portion and being constructed and arranged to expose the conductor at a selected portion thereof located to make electrical contact with a selected conductor plate, a rotary stepping relay assembly including a shaft extending parallel to said conductor plates, a plurality of circularly arranged banks of contacts, means connecting the contacts of each bank to the ends of a vertical row of said plug elements, conductors, and respective switch arms on the shaft sequentially engageable with the banks of contacts responsive to energization of the stepping relay, a line terminal adapted to be connected to the line conductor of the pushbutton dialing assembly, and means to selectively connect said switch arms to said line terminal and simultaneously energize said stepping relay.

9. An automatic telephone dialing attachment of the character described comprising a switch assembly having a plurality of switch terminals adapted to be connected to the pushbutton switch terminals of a pushbutton dialing assembly, respective parallel vertical conductor plates connected to said first-named switch terminals, a plurality of horizontally spaced vertical rows of removable plug elements extending slidably through the plates perpendicular thereto, each plug element comprising an elongated conductor, insulating means surrounding the conductor for its major portion and being constructed and arranged to expose the conductor at a selected portion thereof located to make electrical contact with a selected conductor plate, a rotary stepping relay assembly including a shaft extending parallel to said conductor plates, a plurality of circularly arranged banks of contacts, means connecting the contacts of each bank to the ends of the conductors of a vertical row of said plug element conductors, and respective switch arms on the shaft sequentially engageable with the banks of contacts responsive to energization of the stepping relay, a line terminal adapted to be connected to the line conductor of the pushbutton dialing assembly, pushbutton operated means constructed and arranged to selectively connect said switch arms to said line terminal and to simultaneously energize said stepping relay, an electrically operated indicator device, means to energize said indicator device responsive to the energization of said stepping relay through a period sufficient to allow said switch arms to sequentially engage all the respective contacts of said banks of contacts, and means to deenergize said indicator device as the completion of said period.

References Cited in the file of this patent

UNITED STATES PATENTS

| | | |
|---|---|---|
| 1,635,805 | Wicks | July 12, 1927 |
| 2,107,158 | Lewis | Feb. 1, 1938 |
| 2,301,823 | Shepherd | Nov. 10, 1942 |